Feb. 21, 1933.  R. ENGELS ET AL  1,898,528
APPARATUS FOR VARYING THE LEVERAGE OF THE LINK
AND LEVER GEARING OF VEHICLE BRAKES
Filed Feb. 26, 1931
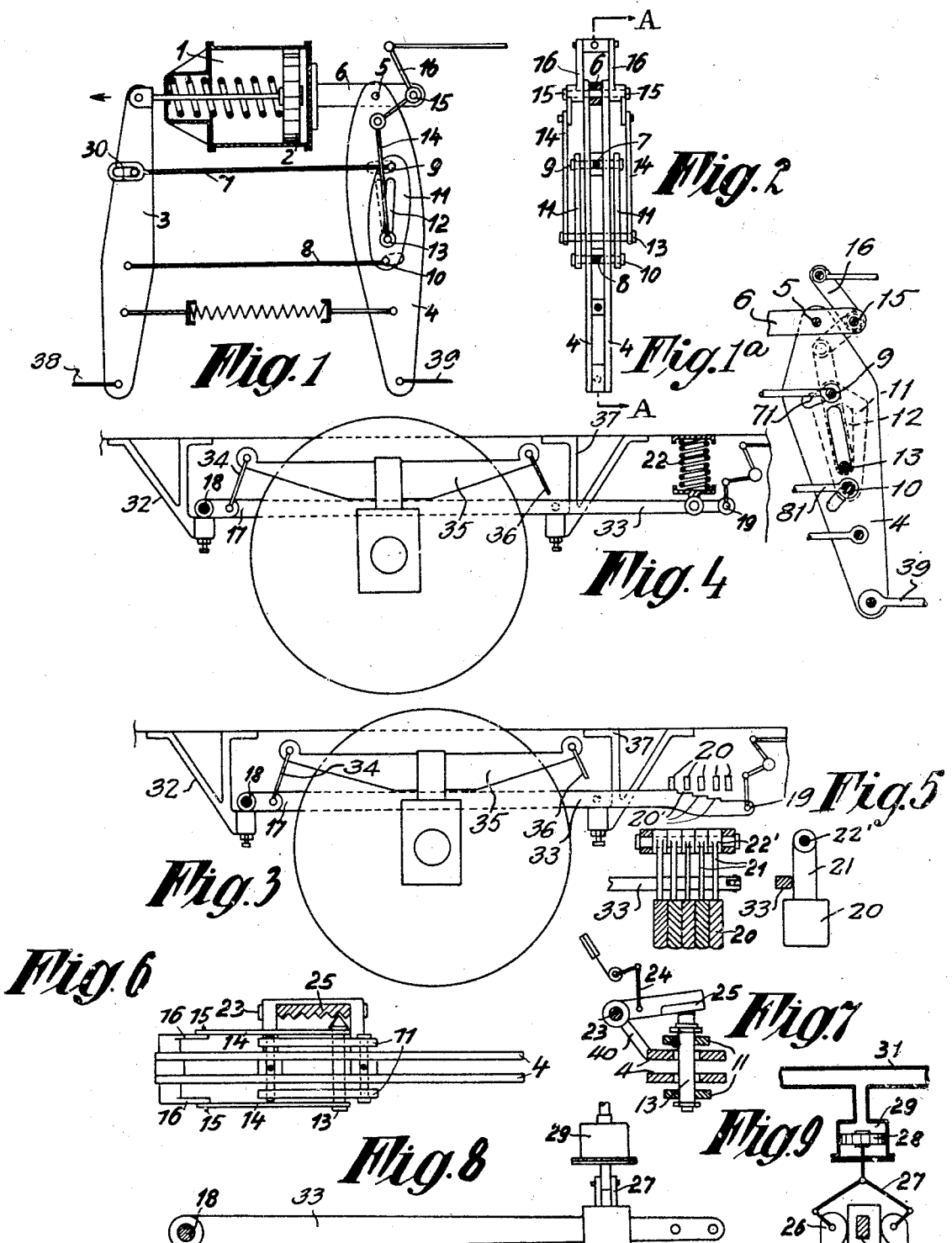
Inventors:
R. Engels and
J. Rihosek Patented Feb. 21, 1933

1,898,528

UNITED STATES PATENT OFFICE

ROBERT ENGELS AND JOHANN RIHOSEK, OF VIENNA, AUSTRIA

APPARATUS FOR VARYING THE LEVERAGE OF THE LINK AND LEVER GEARING OF VEHICLE BRAKES

Application filed February 26, 1931, Serial No. 518,572, and in Austria March 7, 1930.

This invention relates to an apparatus for varying the leverage of the link and lever gearing of vehicle brakes, whereby the force with which the brakes are applied may be varied.

According to the invention a special arrangement of the connecting element between the two brake levers, from which the brake applying force is transmitted to the link and lever gearing, serves for varying the leverage. The invention substantially consists in that the point at which the connecting element is pivoted to one of the levers is made adjustable relatively to the connecting element as well as relatively to this lever in the direction towards the point at which the said lever is pivoted to the adjacent element of the half of this link and lever gearing.

In the annexed drawing an embodiment of our invention is shown by way of example.

Figs. 1 and 2 show diagrammatically in side elevation and end view partly in section respectively an embodiment of our apparatus as applied to an air pressure brake of a railway vehicle. Fig. 1a shows a section on the line A—A of Fig. 2 illustrating a slight modification. Figs 3 and 4 show diagrammatically two embodiments of an apparatus for varying the leverage of link and lever gearings in accordance with the load carried by the vehicle. Fig. 5 is a plan view of the arrangement of the weights 20 of the embodiment shown in Fig. 3. Figs. 6 to 9 show two constructional forms of catching devices for the apparatus for varying the leverage of the link and lever gearing of brakes.

Referring now more particularly to Figs. 1 and 2, 1 is a brake cylinder of known construction in which works a piston 2 to the rod of which is pivoted the brake lever 3. The second brake lever 4 is pivoted as usual at 5 to an extension 6 rigidly connected to the head of the cylinder, 1.

If the two brake levers 3, 4 were only connected by the draw bar 7 the leverage and hence the force with which the brakes are applied would be notably less than in the case where the pivotal connection of the two brake levers is effected by the bar 8 which is pivoted to the two brake levers at a greater distance from the points at which the two levers are pivotally connected to the extension 6 and the piston rod of the brake cylinder respectively.

The position in which the bar 7 is shown results in the smallest leverage and therefore in the smallest force with which the brakes are applied as would be required for instance for an empty vehicle, while the position of the bar 8 corresponds to the force of the application of the brakes required for instance for the greatest load carried by the vehicle, any intermediate position of the draw bar between the positions shown for the bars 7 and 8 must result in a force of the application of the brakes which corresponds to any intermediate load carried by the vehicle from no load up to the maximum load. The other ends as shown in Fig. 1, the bottom ends, actuate in the well known manner, each actuating one half of a pair of link and lever gearings acting on the brake shoes not shown, the one half connected to the lever 3 of the said pair is indicated at 38, the other half connected to the lever 4 is indicated at 39.

Now in accordance with the above observations the draw bars 7 and 8 are connected to the brake lever 4 not by fixed pivots, but by journal pins 9, 10 which engage into longitudinal slots of the lever 4. These journal pins 9, 10 engage also through holes into a link 11 provided with a slot 12 approximately parallel to the lever 4. As shown in Figs. 1 and 2 the brake lever 4 is formed by two parallel plates between which enter the bars 7 and 8 and outside of which the two plates forming the link 11 are arranged so that the journal pins 9, 10 pass through the two plates constituting the lever 4 as well as through the two plates constituting the link 11. Into the slot 12 engages a journal pin 13 attached to the end of a rod 14 pivotally connected to one arm of a bell crank lever 16 journalled at 15 on the extension 6.

Thus a link parallelogram is formed the sides of which are constituted by the draw bars 7, 8, the brake lever 3 and the link 11, and this parallelogram is connected with the brake lever 4 by the journal pin 13. If now the bell crank lever 16 is turned around its fulcrum 15 and thereby the journal pin 13 is shifted in the slot 12 of the link 11, the bearing point of the force transmitted from the brake lever 3 through the said link parallelogram to the brake lever 4 is also shifted and hence the leverage of the pair of link and lever gearings actuated by the brake levers is varied.

In this arrangement the stroke of the piston 2 varies together with the said leverage. However, a stroke of the piston as constant as possible is desirable for the sake of uniformity of the force of the brake cylinder and this condition may be satisfied by increasing the width of the slot 12 in the direction from the journal pin 10 towards the journal pin 9 as shown in Fig. 1a so that the play of journal pin 13 in the slot 12 increases as this journal pin approaches the journal pin 9. Owing to the lost motion resulting therefrom the stroke of the piston 2 remains constant notwithstanding variations in the leverage of the link and lever gearing of the brakes.

In Fig. 1a the bars 71 and 81 take the place of the bars 7 and 8 respectively, as shown in Fig. 1. The bar 81 is pivotally connected directly with the brake lever 4 instead of being connected therewith by means of a slot substantially parallel to the bar 8, as shown in Fig. 1, while the pivot pin 9 of the bar 71 engages in a slot in the lever 4. Otherwise the structure shown in Fig. 1a is exactly the same as that shown in Fig. 1.

The same result may be obtained by providing a longitudinal slot 30 in the left end of the draw bar 7 as indicated in Fig. 1; in this slot travels a pin secured to the brake lever 3.

The journal pin 13 may be adjusted by hand or automatically. In case of adjustment by hand the journal pin 13 is shifted by a hand operated link and lever gearing connected to the bell crank lever 16. In case of automatic adjustment the arrangement shown in Figs. 3 or 4 may be used.

In the constructional form shown in Fig. 4, a part of the weight of the vehicle is transmitted through the bracket 32 to the end 18 of an arm 33 pivoted at this end to the bracket 32. A point 17 of this arm is connected by a link 34 to one end of an ordinary suspending spring 35; the other end of the suspending spring 35 supports a link 36 pivoted in the usual manner to a bracket 37 secured to the vehicle frame. The other end of this arm 33 is connected at 19 to the link and lever gearing for adjusting the journal pin 13 and, as shown in Fig. 3, is provided at its upper side with steps 20' which as the end 19 of this arm 33 is turned upwards, come in succession into engagement with weights 20 mounted on the ends of levers 21, Fig. 5, pivoted at 22' on the underside of the vehicle frame.

As the load on the vehicle increases the vehicle frame is lowered together with the brackets 32 and 37. At the same time the compounds of the total weight of the vehicle coming on the brackets 32 and 37 will increase. But as the link 34 is not directly connected to the bracket 32, but to a point 17 of the arm 33 located between the ends of this arm, this point 17 can move vertically relatively to the bracket 32 and will do so whereby the arm 33 is turned around its pivot point 18 of the bracket 32 so that its stepped part 20' will move upwards. This will continue until the progressively increasing downward action of the weights 20 on the steps 20' of the arm 33 will counterbalance the upward pull exerted by the suspending spring 35 on the link 34. Thus it will be understood that as the load on the vehicle increases the end 19 of the arm 33 will be raised until the arm 33 will reach a position of equilibrium and the pivot pin 13 may be automatically adjusted to correspond by a suitable link and lever gearing actuated by this end 19. It will be understood that in this construction the end of the suspending spring 35 connected to the link 34 will be slightly less depressed than the end of the same spring connected to the link. In view of the fact that the length of the arm between its stepped part 20' and its pivot pin 18 is much greater than the distance between the points 17 and 18, the weight 20 may be comparatively small.

In the constructional form shown in Fig. 4 for the weights 20, Figs. 3 and 5, a spring 22 is substituted which as the load carried by the vehicle is increased or reduced, is put under an increased or reduced tension respectively by the arm 33 thus bringing about the adjustment of the journal pin 13. The operation is otherwise the same as set forth with reference to Figs. 3 and 5.

In order to avoid any accidental shifting of the journal pin 13 during travel a locking device may be provided by means of which the adjusting device for the journal pin 13 or this pin itself may be locked in position, so that any change of position of the journal pin 13 due to the vibrations of the supporting springs during the travel of the vehicle is prevented. Then only a change of the load carried by the vehicle taking place as long as the vehicle is at rest can bring about a re-adjustment of the journal pin 13 after the locking device has been thrown out of operation.

In the constructional form shown in Figs. 6 and 7 in plan view and side elevation, partly in section respectively, a notched arm 25 pivoted at 23 is used. In connection with the construction shown in Figs. 1 and 2 when the arm 25 is raised by turning the same around the pivot 23, the journal pin 13 may be adjusted to the position desired, whereupon the arm 25 is caused to fall again, this bringing the one or the other of its notches into engagement with the end of the journal pin 13 and locking this pin in the position to which it has been adjusted. The arm 25 is pivoted at 23 to an extension or projection 40 of one of the plates of the brake lever 4.

In the constructional form shown in Figs. 8 and 9 and designed more particularly for the constructional forms shown in Figs. 3 or 4 a clamping device 26 comprising two cams is used and is actuated by a link and lever gearing 27 connected to a piston 28 working in a cylinder 29. The piston 26 is actuated by admitting air under pressure into the cylinder 29. This air under pressure may be taken from the train pipe of the brake plant, for which purpose a connection between the cylinder 29 and the train pipe 31 is provided. This clamping device may engage the arm 33 as shown.

The actuation of this device may be effected in any other manner. Also the locking device may be arranged at any other point of the link and lever gearing between the spring suspension and the adjustable journal pin 13.

What we claim is:

1. An apparatus for varying the leverage of the link and lever gearing of vehicle brakes comprising a source of power including two parts movable relatively to each other substantially rectilinearly, two brake levers, one being pivotally connected at one end to one part of the said source of power and the other being pivotally connected at one end to the other part of the said source of power, a pair of brake actuating link and lever gearings, each of the said brake levers being pivotally connected at their other ends, the one to one half and the other to the other half of the said pair of brake actuating link and lever gearings and adapted to move the said two halves in opposite directions, a link parallelogram connecting the said two brake levers with each other between their ends one side of the said link parallelogram being formed by part of one of the brake levers, a pivot pin connecting the opposite side of the said link parallelogram to the other of the said brake levers, and means for shifting the said pivot pin relatively to the ends of the lever with which it is associated.

2. An apparatus for varying the leverage of the link and lever gearing of vehicle brakes comprising a source of power including two parts movable relatively to each other substantially rectilinearly, two brake levers, one being pivotally connected at one end to one part of the said source of power, and the other being pivotally connected at one end to the other part of the said source of power, a pair of brake actuating link and lever gearings, each of the said brake levers being pivotally connected at their other ends, the one to one half and the other to the other half of the said pair of brake actuating link and lever gearings and adapted to move the said two halves in opposite directions, a link parallelogram connecting the said two brake levers with each other between their ends one side of the said link parallelogram being formed by part of one of the brake levers and the opposite side of the said link parallelogram being provided with a longitudinal slot, a longitudinal slot in the other of the said levers, a journal pin passing through both of the said slots and means for shifting the said journal pin along the said slots.

3. An apparatus for varying the leverage of the link and lever gearing of vehicle brakes comprising a source of power including two parts movable relatively to each other substantially rectilinearly, two brake levers, one being pivotally connected at one end to one part of the said source of power, and the other being pivotally connected at one end to the other part of the said source of power, a pair of brake actuating link and lever gearings, each of the said brake levers being pivotally connected at their other ends, the one to one half and the other to the other half of the said pair of brake actuating link and lever gearings and adapted to move the said two halves in opposite directions, a link parallelogram connecting the said two brake levers with each other between their ends, one side of the said link parallelogram being formed by part of one of the brake levers and the opposite side of the said link parallelogram being provided with a longitudinal slot, a longitudinal slot in the other of the said levers, a journal pin passing through both of the said slots and means for shifting the said journal pin along the said slots, the last named means comprising a link and lever gearing provided on the vehicle.

4. An apparatus for varying the leverage of the link and lever gearing of vehicle brakes comprising a source of power including two parts movable relatively to each other substantially rectilinearly, two brake levers, one being pivotally connected at one end to one part of the said source of power, and the other being pivotally connected at one end to the other part of the said source of power, a pair of brake actuating link and lever gearings, each of the said brake levers being pivotally connected at their other ends, the one to one half and the other to the other half of the said pair of brake actuating link and lever gearings and adapted to move the said two halves in opposite directions, a link parallelogram connecting the said two brake levers with each other between their ends one side of the said link parallelogram being formed by parts of one of the brake levers and the opposite side of the said link parallelogram being provided with a longitudinal slot, a longitudinal slot in the other of the said levers, a journal pin passing through both of the said slots and means for shifting the said journal pin along the said slots, the last named means comprising a link and lever gearing on the vehicle and means for adjusting the last named link and lever gearing in accordance with the load carried by the vehicle.

5. An apparatus for varying the leverage of the link and lever gearing of vehicle brakes comprising a source of power including two parts movable relatively to each other substantially rectilinearly, two brake levers, one being pivotally connected at one end to one part of the said source of power, and the other being pivotally connected at one end to the other part of the said source of power, a pair of brake actuating link and lever gearings, each of the said brake levers being pivotally connected at their other ends, the one to one half and the other to the other half of the said pair of brake actuating link and lever gearings and adapted to move the said two halves in opposite directions, a link parallelogram connecting the said two brake levers with each other between their ends, one side of the said link parallelogram being formed by part of one of the brake levers and the opposite side of the said link parallelogram being provided with a longitudinal slot, a longitudinal slot in the other of the said levers, one of the said slots increasing in width from one of its ends to the other, a journal pin passing through both of the said slots and means for shifting the said journal pin along the said slots.

6. An apparatus for varying the leverage of the link and lever gearing of vehicle brakes comprising a source of power including two parts movable relatively to each other substantially rectilinearly, two brake levers, one being pivotally connected at one end to one part of the said source of power, and the other being pivotally connected at one end to the other part of the said source of power, a pair of brake actuating link and lever gearings, each of the said brake levers being pivotally connected at their other ends, the one to the one half and the other to the other half of the said pair of brake actuating link and lever gearings and adapted to move the said two halves in opposite directions, a link parallelogram connecting the said two brake levers with each other between their ends, the said link parallelogram comprising two substantially parallel draw bars extending between the two brake levers, one of the said draw bars being connected with one of the levers by a pin and slot connection, one side of the said link parallelogram being formed by part of one of the brake levers, a pivot pin connecting the opposite side of the said link parallelogram with the other of the said brake levers, and means for shifting the said pivot pin relatively to the ends of the lever with which it is associated.

7. An apparatus for varying the leverage of the link and lever gearing of vehicle brakes comprising a source of power including two parts movable relatively to each other substantially rectilinearly, two brake levers, one being pivotally connected at one end to one part of the said source of power, and the other being pivotally connected at one end to the other part of the said source of power, a pair of brake actuating link and lever gearings, each of the said brake levers being pivotally connected at its other end, the one to one half and the other to the other half of the said pair of brake actuating link and lever gearings and adapted to move the said two halves in opposite directions, a link parallelogram connecting the said two brake levers with each other between their ends, one side of the said link parallelogram being formed by part of one of the brake levers, a pivot pin connecting the opposite side of the said link parallelogram with the other of the said brake levers, and means for shifting the said pivot pin relatively to the ends of the lever with which it is associated and means for locking the said pivot pin in any position to which it is adjusted.

In testimony whereof we affix our signatures.

ROBERT ENGELS.
JOHANN RIHOSEK.